H. W. PATRICK.
COMBINED GASEOUS FUEL AND WATER VAPOR BURNING HEATING APPARATUS.
APPLICATION FILED JAN. 4, 1917.

1,312,080.

Patented Aug. 5, 1919.
2 SHEETS—SHEET 1.

Witness
Samuel S. Matthis

Inventor
Henry Wooster Patrick
by
John N. Goss
his Attorney

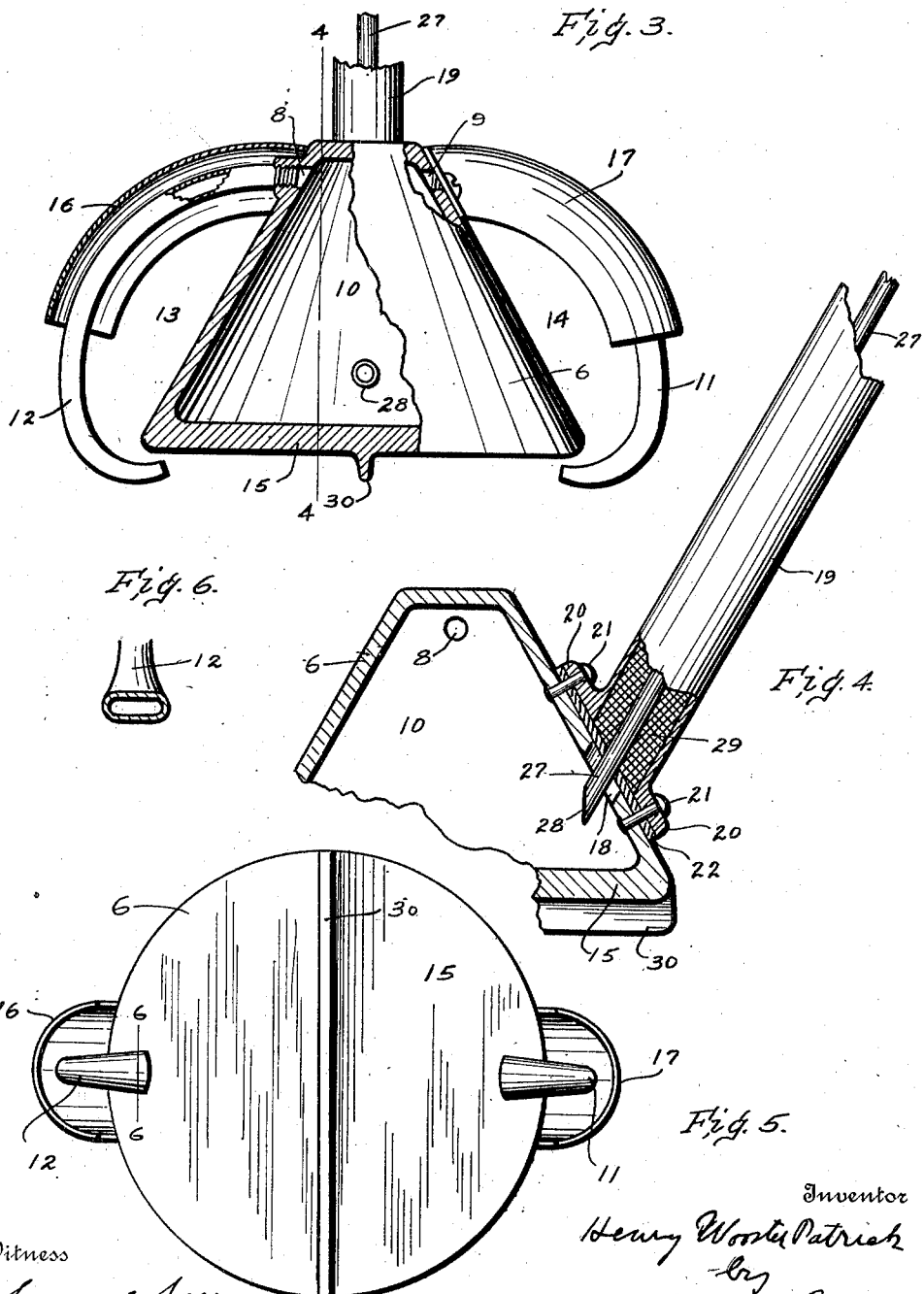

UNITED STATES PATENT OFFICE.

HENRY WOOSTER PATRICK, OF MANSFIELD, OHIO, ASSIGNOR OF ONE-FOURTH TO EVAN F. CLELAND AND ONE-FOURTH TO FORREST A. CLELAND, BOTH OF MANSFIELD, OHIO.

COMBINED GASEOUS-FUEL AND WATER-VAPOR BURNING HEATING APPARATUS.

1,312,080.   Specification of Letters Patent.   Patented Aug. 5, 1919.

Application filed January 4, 1917. Serial No. 140,542.

*To all whom it may concern:*

Be it known that I, HENRY WOOSTER PATRICK, a citizen of the United States of America, residing at Mansfield, in the county of Richland and State of Ohio, have invented certain new and useful Improvements in Combined Gaseous-Fuel and Water-Vapor Burning Heating Apparatus, of which the following is a specification.

This invention relates to heating apparatus, and more particularly to an improved form of heating apparatus having a more efficient burner which is at the same time adapted to supply sufficient moisture to the surrounding air to keep the humidity thereof at any predetermined point.

The object of the invention is to provide a form of heating apparatus having means associated with the burner thereof for flashing a predetermined amount of water into superheated steam and passing such superheated steam into the combustion zone of the burner in such manner that the heat of combustion will be increased and at the same time a substantial quantity of moisture passed into the surrounding air to maintain any desired degree of humidity thereof.

It is a well known fact that where direct heat is employed, as for instance, a gas stove, the humidity of the surrounding air is greatly decreased. Inasmuch as a humidity of about sixty insures the most salutary conditions for human beings it is obvious that anything tending to lower that degree of humidity is deleterious to human health. Recognizing this defect in the ordinary forms of heating apparatus in common use I devised the apparatus forming the subject matter of this invention.

Not only does my improved apparatus insure the desired degree of humidity, but I have found it also much more efficient than any other known to me in that it generates a relatively greater quantity of heat from a given amount of fuel than do other heaters. In my apparatus I insert a metallic vaporizer above the combustion zone wherein a predetermined quantity of water is flashed into superheated steam. This steam is conducted into the combustion zone adjacent the vaporizer with a resulting increase in the heat generated by such combustion.

For purposes of description I have illustrated and described my invention in connection with a gas stove having a conventional rose burner therein. This, however, is merely for descriptive purposes and it is obvious that my invention is by no means limited to the specific application herein illustrated; but that it may be advantageously used in any heating apparatus regardless of the fuel used.

In the drawing, in which like characters of reference designate like parts throughout the several views thereof, Figure 1 is a front elevation of an ordinary type of stove or heating apparatus showing the invention applied thereto and the approximate location of an ordinary rose gaseous burner with respect thereto.

Fig. 3 is a detail view partly in section showing the vaporizer and the steam and water feed pipe connections.

Fig. 4 is a section taken on the line 4—4 of Fig. 3 showing the method of attaching the water feed pipe to the vaporizer.

Fig. 5 is a bottom plan view of the vaporizer and ends of the steam pipes and hoods.

Fig. 6 is a perspective view of the end of one of the steam pipes taken on the line 6—6 of Fig. 5.

Figure 1:
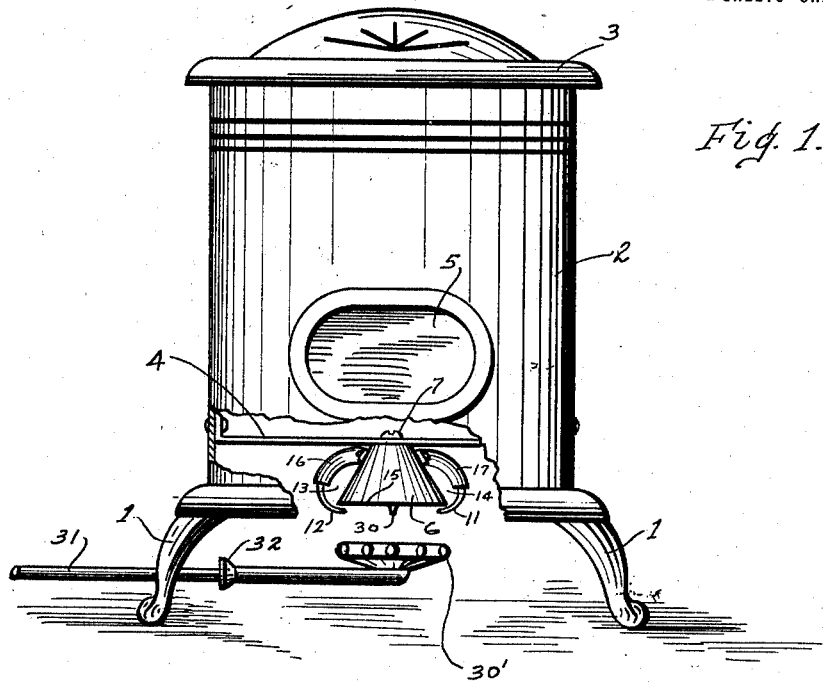
Figure 2:
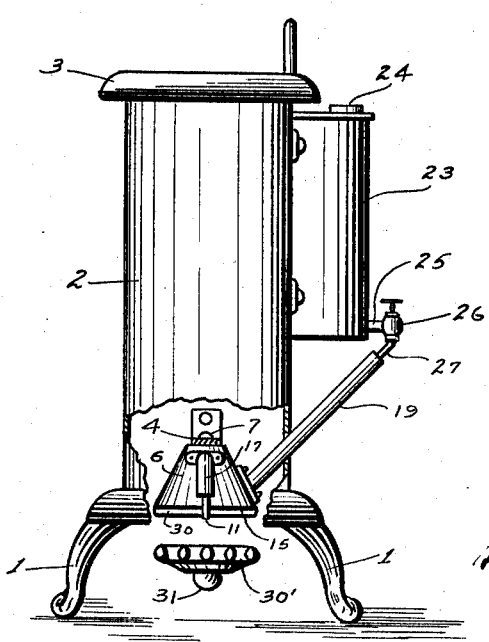
Fig. 2 is a side elevation of Fig. 1.

In the drawings, reference numeral 1 represents the legs of a conventional type of stove or heating apparatus, 2 the casing and 3 the top thereof. A bracket 4 is bolted or otherwise fastened within the casing of the stove preferably extending across the entire width of the casing as clearly shown in Fig. 1. A hollow vaporizer 6 preferably formed cone shape is attached at its apex to the bracket 4 by a bolt 7 which suspends the vaporizer therefrom. Threaded apertures 8 and 9 are provided in the vaporizer adjacent to the apex thereof and are preferably located opposite each other; both being in communication with the chamber 10 of the vaporizer.

Steam pipes 11 and 12 each having one end threaded are connected to the threaded apertures 8 and 9 and the free portions of the steam pipes are curved so as to leave spaces 13 and 14 between the vaporizer and the pipes. The steam pipes adjacent their free ends are bent inwardly toward and extend underneath the vaporizer, and are preferably slightly upturned at their ends to bring them in close proximity to the bottom 15 of the vaporizer. Hoods 16 and 17 are fastened to the vaporizer and arranged to partially extend over the steam pipes with the open portions disposed toward the vaporizer to permit circulation of the heated products of combustion around the steam pipes.

An opening 18 which communicates with the chamber 10 is provided in the vaporizer and preferably located in close proximity to the bottom thereof. A casing 19 which is provided with an annular flange 20 is fastened to the exterior of the vaporizer at one end by the bolts 21 or any other well known fastening means. An asbestos washer 22 is preferably interposed between the face of said flange and the exterior of the vaporizer as shown in Fig. 4.

A water supply tank 23 is preferably fastened to the back portion of the casing of the stove by any well known means, and it is equipped with a conventional type of cover 24. A nipple 25 is threadably engaged with a suitable threaded aperture provided in the water tank adjacent to the bottom thereof, and a needle or other valve 26 which is adapted to permit a pre-determined amount of water to flow therethrough is preferably connected to the threaded free end of the nipple so as to leave the threaded outlet of the valve in a vertical position.

A feed water pipe 27 is connected to the valve 26 and it extends into and through the casing 19 leaving its inclined end 28 projecting through the enlarged opening 18 into the chamber 10 of the vaporizer. Asbestos packing 29 is fitted within the casing 19 to surround the feed water pipe 27. The bottom 15 of the vaporizer is provided with a deflector or baffle rib 30 to deflect or baffle the steam from flowing out of the ends of the steam pipes and across the bottom of the vaporizer. The baffle or deflector rib serves to obstruct the flow of steam, thereby forcing it to back up and to spread over a larger area of the bottom of the vaporizer than it would if a baffle or deflecting rib was not used.

A conventional type of rose burner 30' is supplied with gaseous fuel through a pipe 31 having an air mixer 32. The burner is used for the purpose of heating the vaporizer 6. In the use or operation of the heating apparatus or stove to accomplish the objects herein described for the purpose intended, water is conducted from any source of supply to the valve 26 and passes through the valve. The quantity of water passing through said valve is regulated to permit a predetermined amount of water to pass through the valve into the feed pipe 27 and from the end 28 which is in communication with the chamber 10 of the vaporizer. As the water drops from the end 28 of the feed pipe on the bottom 15 of the vaporizer, it is instantly flashed into steam or vapor and as the steam rises up in the heated chamber it is super-heated. The super-heated steam then passes into the steam pipes, escaping from the ends thereof at points preferably located opposite each other underneath the bottom of the vaporizer thereby mixing with or passing in close proximity to the flame of the gaseous burner during combustion of the gaseous fuel.

I have found that when superheated steam is fed into the combustion zone a distinct secondary combustion zone is set up above the primary combustion zone with an accompanying increase in the heat of combustion, a considerably greater heating effect being secured from a stove equipped with this form of vaporizer than from the same stove without the vaporizer. Apparently there is a decomposition of part of the superheated steam upon contact with the highly heated metal of the vaporizer, the decomposition products then taking part in the combustion, or rather in a secondary combustion, to increase the intensity of the heat evolved. The undecomposed steam, added to that generated during the combustion of the fuel, passes off into the surrounding air to maintain the humidity thereof at the desired point. Obviously the amount of moisture thus added to the atmosphere may be varied at will by varying the quantity of water passed into the vaporizer through the pipe 27.

The hoods 16 and 17 tend to catch the combustion products from the gaseous fuel burner permitting their circulation around the steam pipes to further super-heat the steam passing through the steam pipes. The packing 29 is for the purpose of insulating the feed pipe from the heat of the vaporizer to prevent the water from being vaporized before it is dropped or deposited upon the bottom of the vaporizer.

I claim:—

1. In a heating apparatus comprising a burner; a water vaporizer located adjacent the burner and above the combustion zone, said vaporizer, during operation of the heating apparatus, being adapted to flash water into superheated steam; and means for conducting such superheated steam into contact with the outside of the vaporizer without prior admixture with the fuel in the combustion zone.

2. In a heating apparatus comprising a burner; a water vaporizer located adjacent the burner and above the combustion zone, said vaporizer being adapted during operation of the heating apparatus to flash water into superheated steam; and means for conducting such superheated steam into contact with the outside of the vaporizer without prior admixture with the fuel in the combustion zone, said conducting means being so positioned as to be subjected to heat from the combustion zone to further superheat the steam.

3. In a heating apparatus comprising a burner; a water vaporizer located adjacent the burner and above the combustion zone thereof, said vaporizer being adapted during operation of the heating apparatus to flash water into superheated steam; a pipe for conducting such superheated steam into direct contact with the outside of the vaporizer without prior admixture with the fuel in the combustion zone; and a hood surrounding said conducting pipe and adapted to direct the heated products of combustion thereagainst to cause further superheating of the steam during passage through said pipe.

4. In a heating apparatus comprising a burner; a water vaporizer located adjacent the burner and above the combustion zone, said vaporizer being adapted during operation of the heating apparatus to flash water into superheated steam; means for conducting such superheated steam into contact with the outside of the vaporizer without prior admixture with the fuel in the combustion zone; and deflecting means carried by the vaporizer adjacent the outlet of the said conducting means.

5. In a heating apparatus comprising a burner; a water vaporizer located adjacent the burner and above the combustion zone thereof, said vaporizer being adapted during operation of the heating apparatus to flash water into superheated steam; a pipe for conducting such superheated steam into direct contact with the outside of the vaporizer without prior admixture with the fuel in the combustion zone; a hood surrounding the said conducting pipe and adapted to direct the heated products of combustion thereagainst to cause further superheating of the steam during passage through said pipe; and deflecting means upon the exterior of said vaporizer adjacent the outlet end of said conducting pipe.

6. In a combined gaseous fuel and water vapor burning heating apparatus, a cone-shaped water vaporizer having a rib formed on the bottom, means to conduct water to said vaporizer, means adapted to heat the vaporizer through the medium of a gaseous flame, means to conduct super-heated steam generated in the vaporizer to mix with the flame of the heating means, and means to permit a pre-determined quantity of water to pass into the vaporizer.

7. In a combined gaseous fuel and water burning heating apparatus comprising a water vaporizer adapted to flash water into steam, means to conduct water to the vaporizer, means to regulate the quantity of water delivered to the vaporizer, means to heat the vaporizer having a flame emitting therefrom, separate means to conduct the steam generated from the water to mix with the flame of the heating means, and hoods partially covering said last mentioned means.

In testimony whereof I affix my signature.

HENRY WOOSTER PATRICK.

Copies of this patent may be obtained for five cents each, by addressing the "Commissioner of Patents, Washington, D. C."